United States Patent [19]

Thielen

[11] Patent Number: 4,648,738
[45] Date of Patent: Mar. 10, 1987

[54] LOCKING PIN

[75] Inventor: James E. Thielen, New Brighton, Minn.

[73] Assignee: Minnesota Mining and Manufacturing Company, St. Paul, Minn.

[21] Appl. No.: 744,932

[22] Filed: Jun. 14, 1985

Related U.S. Application Data

[63] Continuation-in-part of Ser. No. 551,293, Nov. 14, 1983, abandoned.

[51] Int. Cl.$^4$ .............................. F16B 1/00; F16D 3/00
[52] U.S. Cl. ...................................... 403/341; 403/58; 403/340; 403/74; 411/338; 15/147 A; 15/144 A
[58] Field of Search ............ 403/341, 340, 58, 74, 403/161, 364; 411/338, 339; 15/147 A, 144 A; 464/112, 136

[56] References Cited

U.S. PATENT DOCUMENTS

| | | | |
|---|---|---|---|
| 709,400 | 9/1902 | Fitzpatrick | 403/341 |
| 1,348,692 | 8/1920 | Bell | 403/340 |
| 1,391,364 | 9/1921 | Bulow | 403/340 |
| 2,111,267 | 3/1938 | Hoppenstand | 411/338 |
| 2,201,551 | 5/1940 | Welk | 411/339 |
| 2,258,053 | 10/1941 | Harris | 403/340 |
| 2,292,128 | 8/1942 | King | 411/338 |
| 3,220,757 | 11/1965 | Potter | 403/340 |
| 3,373,397 | 3/1968 | Renshaw, Jr. | 339/47 |
| 3,420,559 | 1/1969 | Schaefer | 411/338 |
| 3,489,987 | 1/1970 | Niskin | 339/49 |
| 3,778,860 | 12/1973 | Thielen | 15/147 |
| 3,850,533 | 11/1974 | Thielen | 403/58 |
| 4,080,842 | 3/1978 | Lapeyre et al. | 403/340 |

FOREIGN PATENT DOCUMENTS 729520 12/1942 Fed. Rep. of Germany ...... 403/340

Primary Examiner—Cornelius J. Husar
Assistant Examiner—Todd G. Williams
Attorney, Agent, or Firm—Donald M. Sell; James A. Smith; David L. Weinstein

[57] ABSTRACT

A locking pin for connecting elements having a common bore comprising two coupling units. The coupling action is provided by teeth which engage when the two coupling units are engaged. The teeth exhibit a ratchet effect, whereby the coupling units can be engaged relatively easily by pushing the coupling units together but cannot be easily disengaged by pulling them apart.

13 Claims, 4 Drawing Figures

LOCKING PIN

This application is a continuation-in-part of U.S. patent application Ser. No. 551,293 filed Nov. 14, 1983, now abandoned.

BACKGROUND OF THE INVENTION

This invention relates to fasteners, and in particular, to fasteners comprising two mating portions.

Locking pins, plugs, and the like for securing elements having a common bore are described in U.S. Pat. No. 3,778,860. These locking devices sometimes fall out of the bore into which they have been inserted, resulting in either separation of the elements that were connected or loss of the locking device in areas where they are not desired, or both. For example, the loss of a locking device from a mop used to clean jet aircraft exteriors in the vicinity of the jet engine could lead to severe damage to the engine.

SUMMARY OF THE INVENTION

The invention provides a locking pin for connecting elements having a common bore. The locking pin comprises two coupling units that can be engaged in simple manner. Each coupling unit comprises a post member having two ends, at one of which ends is disposed (1) a first elongated member projecting therefrom, said first elongated member having teeth formed thereon, so that when two coupling units are engaged in a bore, they are firmly held against separation by means of the interlocking action of the teeth; and (2) a second elongated member projecting therefrom and separated from said first elongated member by a cavity or groove, said second elongated member serving to prevent the teeth on said first elongated member on one of the two coupling units from becoming disengaged from the teeth on said first elongated member on the other of the two coupling units.

The cavity or groove of one coupling unit has dimension sufficient to accommodate the first elongated member of the other coupling unit. At the other end of the post member is disposed a head, preferably having a cylindrical configuration said head preferably having a groove in the periphery therof to accommodate an O-ring. The O-ring frictionally engages the inner walls of the bore to provide a tight fit when the connecting elements are in the desired position. The interlocking coupling action of the teeth prevents the coupling units of the locking pin from falling out of the bore once they are engaged therein.

DETAILED DESCRIPTION

Figure 4:
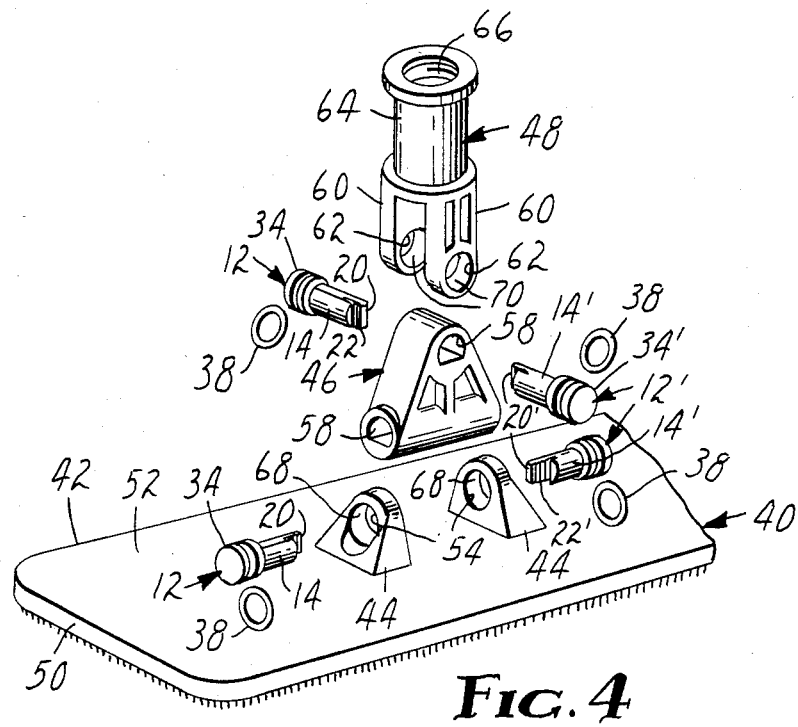
FIG. 4 is an exploded perspective view of a coupling unit of the locking pin of this invention in use with a mop having a universal joint.

The number 12 refers to a single coupling unit of which two such units are required to be brought into engagement to form the locking pin. The number 12' refers to the coupling unit which engages coupling unit 12. Unprimed reference numerals refer to portions of coupling unit 12. Primed reference numerals refer to portions of coupling unit 12' that correspond to like portions of coupling unit 12.

Coupling unit 12 comprises post member 14 having two ends 16, 18. The post member 14 can have numerous cross-sectional configurations, for example circular, elliptical, or polygonal, e.g., rectangular, pentagonal, hexagonal, octagonal. The post member 14 will usually have the same cross-sectional configuration as the bore into which it is to be inserted. In the preferred embodiment of this invention, post member 14 and the bore into which it will be inserted have identical or substantially identical D-shaped cross-sections so that (1) the coupling units 12,12' can be properly aligned for assembly and (2) the locking pin will not rotate when assembled in the bore.

From one end 16 of post member 14 projects a first elongated member 20. The first elongated member 20 has a plurality of teeth 22 formed thereon. The teeth 22 are positioned on said first elongated member 20 on said coupling unit 12 so that they will engage with like teeth 22' on said first elongated member 20' on said identical or substantially identical coupling unit 12'. It is preferred that the first elongated member 20 have at least three teeth, to provide adequate engagement of the coupling units 12,12' sufficient to resist separation of the units under varying conditions of use. Elongated member 20 should have sufficient length so that it can carry sufficient teeth 22 to insure adequate engagement. It is preferred that the teeth have at least a right-angled, preferably obtuse-angled, triangular cross-section. The base 22a of the triangle abuts the surface of elongated member 20. The longest side 22b of the triangle joins base 22a to form an interior angle of about 25° to about 50°. The remaining side 22c of the triangle forms an interior angle of 90° to about 105° with side 22a. It is preferred that all the teeth on each coupling unit be identical, both for ease of manufacture and ease of coupling.

As the teeth become engaged, they preferably exhibit a ratchet effect, whereby the teeth on the elongated member of one coupling unit 12 can easily engage the teeth on the elongated member of the other coupling unit 12' when the units are pushed together, but cannot be easily disengaged if the units are pulled apart.

The first elongated member 20 should be slightly flexible at its neck 24 so that when the coupling units 12, 12' are driven together, the member 20 can bend at the neck 24 so that the teeth 22 of one unit 12 can interlock with the teeth 22' of the other unit 12' without resulting in damage to the teeth or to the first elongated members of either unit.

From the end 16 of post member 14 projects a second elongated member 26. Second elongated member 26 is substantially parallel to first elongated member 20. The second elongated member 26 of one coupling unit 12 serves to prevent the first elongated member 20' of the other coupling unit 12' from separating from the first elongated member 20 of coupling unit 12, thereby preventing the teeth 22, 22' of the first elongated members 20, 20' of coupling units 12, 12' from becoming disengaged.

Between second member 26 and first member 20 of coupling unit 12 is a cavity or groove 28 cut sufficiently deep and wide to accommodate first elongated member 20' of coupling unit 12' when the coupling units 12, 12' are joined.

The ratio of the length of the first elongated member 20 to the length of the post member 14 is preferably 2:1 or less, e.g. 1:3. This ratio, however, can vary from the preferred range, depending upon the use of the locking pin.

The length of the second elongated member 26 must be sufficiently long so that it will prevent the teeth 22' of the first elongated member 20' of coupling unit 12' from disengaging the teeth 22 of the first elongated member 20 of coupling unit 12.

The ratio of the length of the second elongated member 26 to the length of the first elongated member 20 preferably ranges from 1:3 to 1:1. If the length of the second elongated member 26 is less than the length of the first elongated member 20, a shoulder 30 disposed behind said first elongated member 20 can be formed on said post member 14, the periphery of said shoulder 30 of one coupling unit 12 being substantially co-planar with the periphery of said second elongated member 26' of the other coupling unit 12'. The length of the shoulder 30 plus the length of the second elongated member 26 is equal to or less than the length of the first elongated member 20. If such a shoulder 30 is formed, a flexing means 32, e.g. a groove or slit, should be provided between the shoulder 30 and the first elongated member 20 to allow the first elongated member 20 to flex when the coupling units 12, 12' are driven together.

It is important that the first elongated member 20 be positioned on post 14 so that the points of teeth 22 face second elongated member 26 and extend a sufficient distance through the axis of the locking pin to provide a stable coupling action. The axis of the locking pin intersects, preferably bisects, the longest side 22b of the triangular cross-section of the teeth 22.

At end 18 of post 14 is disposed a head 34, preferably having a cylindrical configuration, which can have a circumferential groove 36 therein to accommodate an O-ring 38. O-ring 38 has an inner circumference about the same as that seated therein, the thickness of O-ring 38 and the depth of groove 36 being such that part of O-ring 38 extends beyond head 34. The purpose of the O-ring is to frictionally engage the inner walls of the bore into which the coupling units are inserted in order to provide a tight fit, whereby the connecting members can be held in the desired position.

Preferably, the coupling units 12, 12' are made of a yieldable resilient plastic material, e.g. nylon, to allow the units to resiliently deform as required during the interlocking of the teeth 22, 22'. O-rings 38 are preferably of a butadiene-acrylonitrile rubber copolymer having a durometer of about 70 to provide long life as well as good oil and water resistance.

Figure 1:
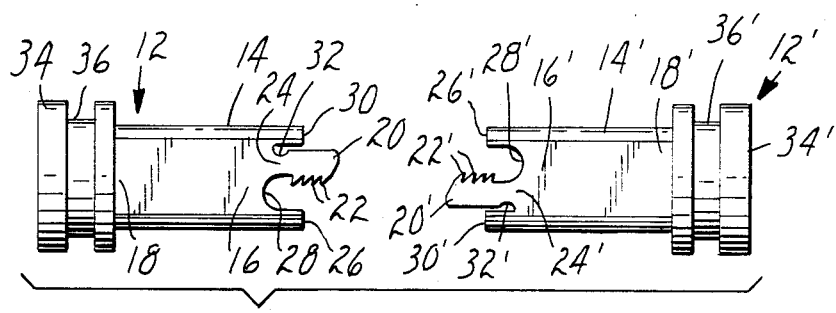
FIG. 1 is a longitudinal plan view of one embodiment of the locking pin of this invention.
Figure 2:
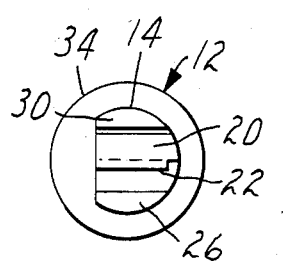
FIG. 2 is an end view of the left coupling unit of FIG. 1.
Figure 3:
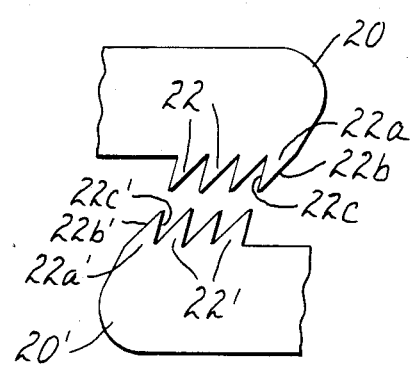
FIG. 3 is an enlarged view showing the teeth portion of the coupling units.

Coupling units 12 and 12' need not necessarily be identical, as they are so shown in FIG. 1. For example, the length of post member 14 may differ from that of post member 14', the overall length of coupling unit 12 may differ from that of coupling unit 12', the shape and dimensions of head 34 may differ from those of head 34'. It is preferred, however, that coupling unit 12 be identical or substantially identical to coupling unit 12'.

OPERATION

The locking pin of the present invention is particularly well-suited for connecting the elements of the mop assembly 40 described in U.S. Pat. No. 3,778,860, incorporated herein by reference. Mop assembly 40 comprises frame 42, universal joint formed of a pair of bifurcate holding members 44 and a connecting member 46 held together by locking pins formed from coupling units 12, 12', and handle holder 48. Frame 42 comprises a base portion 50 which may be of any desired configuration suitable for the intended purpose of the mop, e.g., square, rectangular, elliptical, circular, etc.

Upper surface 52 of base 50 has thereon a pair of holding members 44 with axially aligned openings 54 therethrough, which are an integral part of universal joint about to be described. If desired, holding members 44 may be recessed in a depression in upper surface 52 of base 50, be attached to base 50 by rivets or adhesive, or molded as an integral portion thereof. Attached to holding members 44 is connecting member 46 which has two bores 58 therethrough, the axes of said bores 58 being at right angles to each other.

Handle holder 48 comprises arms 60 having axially aligned circular openings 62 therethrough. The upper end of handle holder 48 comprises socket 64 having internal threads 66 for attaching an externally complementarily threaded mop handle (not shown). If desired, socket 64 can be replaced with any available type of handle holding means. One of the bores 58 is positioned between holding members 44, the other bore 58 being positioned between openings 62 of arms 60. In order to form the assembled locking pin, the coupling units 12, 12' are aligned so that the teeth 22, 22' on elongated members 20, 20' will interlock when the units are driven together. In the preferred embodiment, the flat portion of D-shaped post member 14 is placed flush against flat portion of D-shaped bore 58. In this manner, the elongated members 20, 20' will be properly aligned.

When the two coupling units 12, 12' of a locking pin are inserted into bore 58, the teeth 22 on one elongated member 20 will lock together with the teeth 22' on the other elongated member 20' and remain permanently locked, unable to be pulled apart by reasonable axial forces. O-ring 38 frictionally engages inner walls 68 of openings 54 in base 50 and inner walls 70 of openings 62 in arms 60, the friction fit providing universal joint with a freedom of movement which permits manual adjustment to various positions, the friction fit retaining the preselected position during use of the mop.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A first coupling unit capable of engaging a second coupling unit to form a locking pin, said first coupling unit comprising
    (A) a post member having two ends;
    (B) at one end of which post member is a head;
    (C) at the other end of which post member is
        (1) a first elongated member projecting from said post member, said first elongated member having a plurality of teeth thereon, which teeth are capable of engaging with like teeth on a first elongated member on a second coupling when two coupling units are engaged to form said locking pin, said first elongated members being capable of flexing so that two coupling units can be engaged in a bore to form said locking pin, and
        (2) a second elongated member projecting from said post member, said second elongated member being of sufficient length to prevent said engaged teeth on the first elongated members of engaged coupling units from disengaging, said second elongated member being positioned on said post member so that there is a cavity between said second elongated member and said first elongated member, said cavity capable of accommodating the first elongated member from said second coupling unit.

2. The coupling unit of claim 1 wherein said teeth on said first elongated member have points which face said second elongated member.

3. The coupling unit of claim 1 wherein said teeth have a cross-section in the form of a triangle, the base of which triangle abuts the surface of said first elongated member, the longest side of which triangle joins the base to form an interior angle of about 25° to about 50°, and the remaining side of which triangle joins the base to form an interior angle of 90° to about 105°.

4. The coupling unit of claim 1 wherein said post member has a circular cross-section.

5. The coupling unit of claim 1 wherein said post member has a D-shaped cross-section.

6. The coupling unit of claim 1 wherein said post member has a polygonal cross-section.

7. The coupling unit of claim 1 wherein said head has a cylindrical configuration, said head having a circumferential groove formed therein, whereby said head can accommodate an O-ring.

8. The first coupling unit of claim 1 wherein a shoulder projects from said post member, said shoulder being disposed so that when said first coupling unit is joined with a second coupling unit, the periphery of said shoulder is co-planar with the periphery of the second elongated member of said second coupling unit.

9. The coupling unit of claim 1 wherein said first elongated member has a flexible neck, whereby said first elongated member can bend when said coupling units are being engaged so that teeth of both coupling units can interlock without resulting in damage to the teeth or to the first elongated member of either coupling unit.

10. A locking pin comprising two of the coupling units of claim 1.

11. The locking pin of claim 10 wherein the two coupling units are identical or substantially identical.

12. An article comprising at least two connecting elements having a common bore, said elements being secured by the locking pin of claim 10.

13. The article of claim 12, said article being in the form of a mop assembly.

* * * * *